No. 695,802. Patented Mar. 18, 1902.
L. J. DIRAND.
MOTOR VEHICLE.
(Application filed July 6, 1901.)
(No Model.) 3 Sheets—Sheet 3.
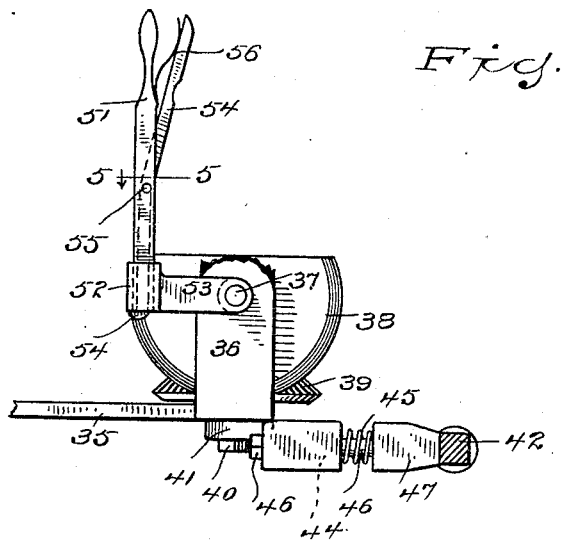
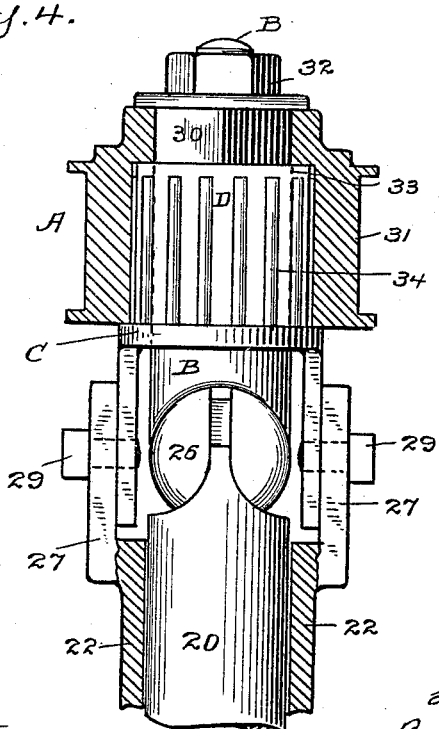
WITNESSES. INVENTOR.

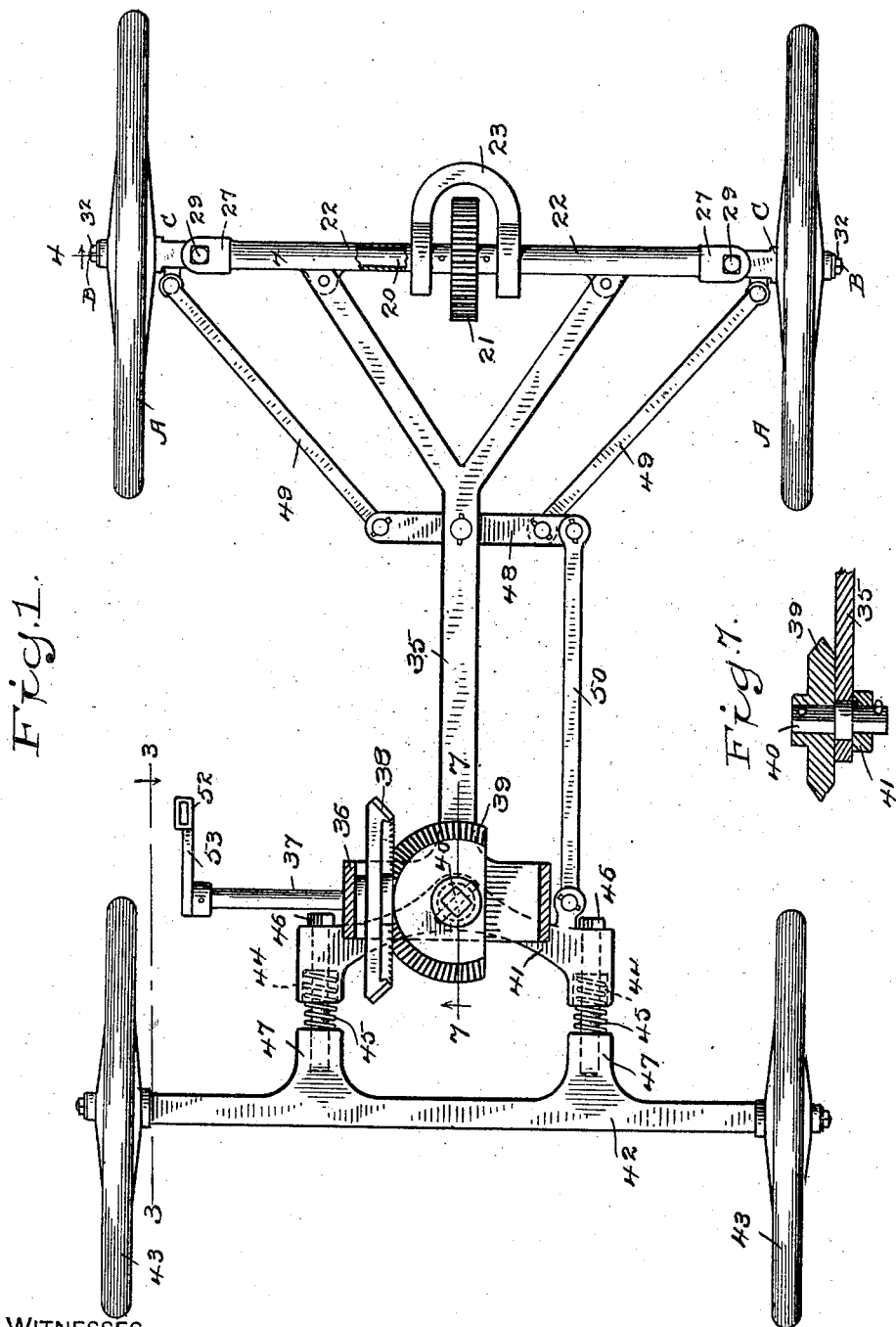

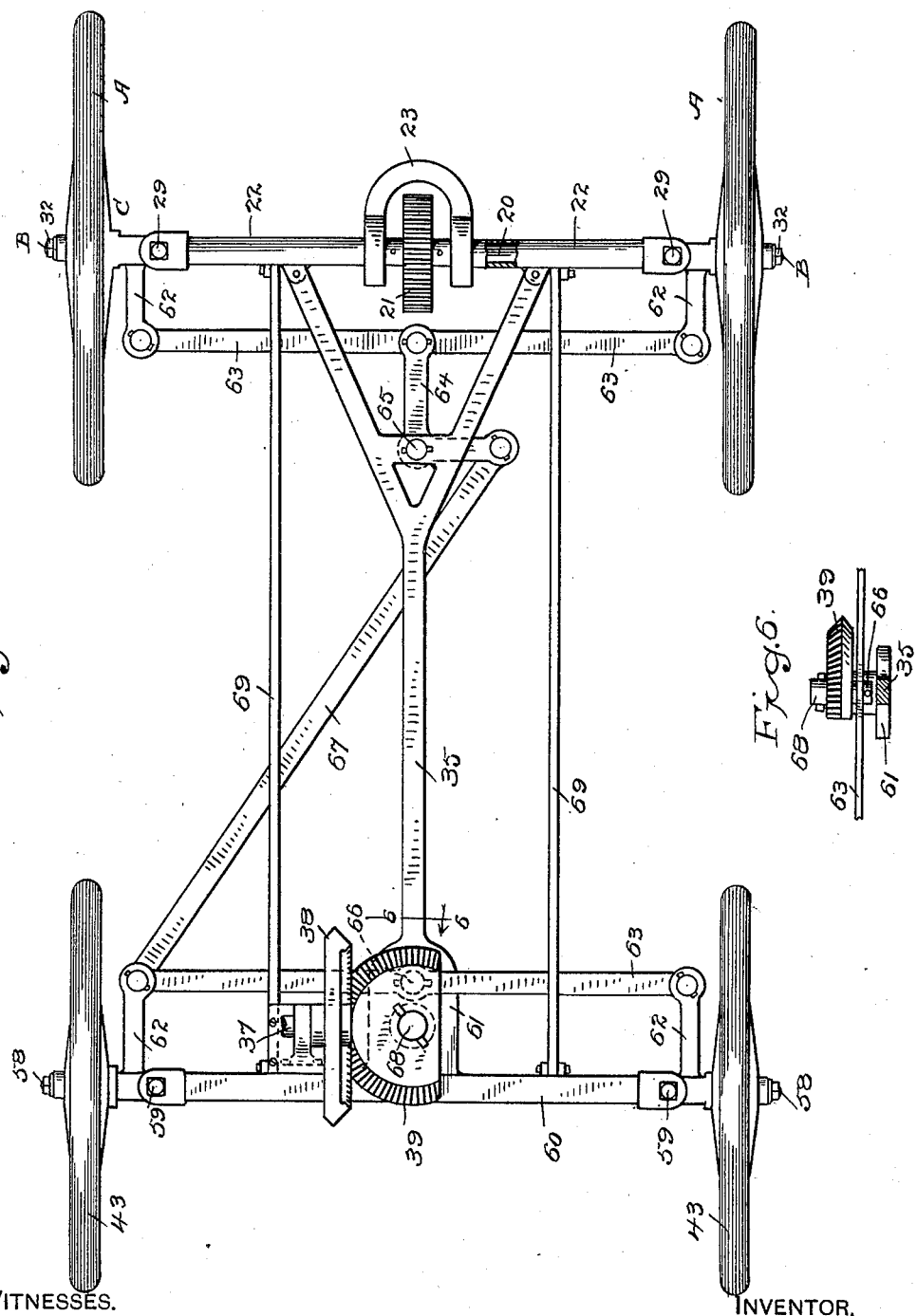

UNITED STATES PATENT OFFICE.

LOUIS J. DIRAND, OF TORRINGTON, CONNECTICUT.

MOTOR-VEHICLE.

SPECIFICATION forming part of Letters Patent No. 695,802, dated March 18, 1902.

Application filed July 6, 1901. Serial No. 67,361. (No model.)

*To all whom it may concern:*

Be it known that I, LOUIS J. DIRAND, a citizen of the United States, residing at Torrington, county of Litchfield, State of Connecticut, have invented a new and useful Driving and Steering Mechanism for Motor-Vehicles, of which the following is a specification.

My invention relates to the structure of motor-vehicles, and has for its object to so improve the mode of applying power to the driven axle and of steering the vehicle as to do away with numerous parts heretofore deemed essential, to lighten and strengthen the structure as a whole, to improve its riding qualities and increase its life, and, furthermore, to enable the vehicle to be steered much more easily than has heretofore been possible and to turn in a shorter radius.

In order to accomplish the desired results, I have devised a structure in which the rotating rear axle is jointed in such a manner as to permit the spindles of the rear wheels to oscillate in the horizontal plane.

I have furthermore devised various improvements in the details of construction, which will hereinafter be fully described and then specifically pointed out in the claims.

In the accompanying drawings, forming part of this specification, Figure 1 is a plan view of the running-gear of a motor-vehicle embodying a preferred form of my novel improvements; Fig. 2, a similar view illustrating a running-gear embodying my novel jointed rear axle and also having the usual jointed non-rotating front axle; Fig. 3, a detail elevation, the front axle being in section on the line 3 3 in Fig. 1; Fig. 4, an enlarged detail sectional view on the line 4 4 in Fig. 1, illustrating the structure of the rear axle, spindles, and joints; Fig. 5, a detail sectional view on the line 5 5 in Fig. 3; Fig. 6, a detail elevation, the reach being in section, on the line 6 6 in Fig. 2; and Fig. 7 is a detail sectional view on the line 7 7 in Fig. 1.

20 denotes the rear axle, shown as carrying a gear-wheel 21, to which power may be applied in any ordinary or preferred manner. This axle is inclosed in sleeves 22, which are connected by a yoke 23, inclosing the gear-wheel.

A denotes the rear wheels, which are fixed to their spindles B, which in turn are connected to the rear axle by universal joints 26.

At the outer ends of sleeves 22 are ears 27, between which are pivoted, as at 29, the spindle-carriers C. The spindles are provided with angular portions 30, to which the hubs 31 of the rear wheels are rigidly secured, the angular portions of the spindles preventing the hubs from turning thereon and the hubs being retained upon the spindles by means of nuts 32. Within the hubs and exterior to the spindles are roller-bearings D, which may be of any ordinary or preferred construction. I have shown a roller-bearing consisting of a sleeve 33, which forms an integral part of the spindle-carrier and is provided with longitudinal slots in which rollers 34 are journaled, said rollers being of greater diameter than the thickness of the sleeve, so as to be engaged internally by the spindle and externally by the hub.

The structure will, it is believed, be readily understood from Fig. 4, from which it will be apparent that the axle, spindle, and hub rotate, the rollers in the spindle-carrier providing an external antifriction-bearing for the spindle and an internal antifriction-bearing for the hub. The spindle-carriers, and with them the spindles and wheels, swing freely on the pivots 29, thus giving the rear wheels free oscillation in the horizontal plane, the universal joints 26 permitting this horizontal oscillation of the spindles and the wheels carried thereby wholly independently of the rotation of the axles and the spindles. The special mode in which oscillatory movement for the purpose of steering is imparted to the spindles and rear wheels may be varied greatly without departing from the principle of my invention.

In Figs. 1, 3, and 7 I have illustrated a construction in which a bifurcated reach 35 is rigidly secured to the rear axle. At the forward end of the reach is an upwardly-extending bracket 36, in which a rock-shaft 37 is journaled. This rock-shaft is shown as carrying a bevel gear-wheel 38, meshing with a bevel gear-wheel 39 on a vertical shaft 40, which is journaled in the base of the bracket and carries under the bracket a cross-piece 41. 42 denotes the front axle, and 43 the front wheels which rotate thereon. In this form I have shown the front axle as yieldingly connected to the cross-piece, so that when either of the front wheels strikes a stone or other obstruction the force of the blow will be taken up intermediately and not transmitted to the body of the vehicle. (Not shown in the drawings.) I have shown the cross-piece as provided with sockets 44, which partly receive springs 45. Bolts 46 pass loosely through the bases of the sockets and the springs and engage bosses 47 on the front axle. The outer ends of the sockets and the bosses are at sufficient distance apart so that they cannot come in contact in use. Whenever either wheel strikes an obstruction, either or both of the springs will yield and take up the force of the blow. 48 denotes a cross-bar pivoted to the reach, 49 links pivoted to the cross-bar and to the spindle-carriers, and 50 a link one end of which is pivoted to the cross-bar and the other to cross-piece 41. It will be obvious, therefore, that when the rock-shaft is oscillated gear-wheels 38 and 39 will transmit movement to the vertical shaft carrying cross-piece 41, which by means of the yielding connections already described will oscillate the front axle and by means of links 49 and 50 will oscillate the spindle-carriers and the spindles carrying the rear wheels. As a simple and convenient means of oscillating the rock-shaft and also of rendering the machine non-usable by depriving it of suitable steering mechanism, I provide a detachable steering-lever 51, which is adapted to engage a socket 52 at the outer end of an arm 53, which extends from the rock-shaft. Steering-lever 51 is made U-shaped in cross-section and just fits snugly in socket 52, but is readily removable therefrom. The steering-lever is locked in the socket by means of a hooked latch 54, which is pivoted within the U-shaped lever, as at 55. (See Figs. 4 and 5.) The hook at the lower end of the latch catches under the socket, and a spring 56 acts to retain the latch in the locking position, as clearly shown in Fig. 3. Should it be required at any time to render a motor-vehicle non-usable by depriving it of suitable steering mechanism, the operator manipulates the hooked latch against the power of the spring, so as to release the steering-lever and permit its removal from the socket.

In the form illustrated in Fig. 2 the yielding connection between the front axle and the steering mechanism is dispensed with and the front wheels 43 turn freely on their spindles 58, which are themselves pivoted, as at 59, to the front axle 60. A bifurcated reach 35 is rigidly secured to the rear axle, as in the other form, and is also rigidly secured to the front axle. I have shown the reach in this form as made integral with or rigidly secured to a plate 61, which is in turn rigidly secured to the axle, the special construction and mode of connection of the axle, plate, and reach being unimportant so far as the principle of the invention is concerned. The spindle-carriers C and the spindles 58 are shown in this form as provided with rigid inwardly-extending arms 62. The outer ends of both pairs of arms are connected by links 63, the mid-length of the rear link 63 being pivoted to a bell-crank lever 64, which is in turn pivoted to the reach, as at 65, and the front link 63 pivoted to the horizontal gear-wheel 39, as at 66. 67 denotes a diagonal link which connects one of the front arms 62 with the arm of the bell-crank lever not pivoted to the rear link 63. The horizontal gear-wheel 39, to which front link 63 is pivoted, is mounted to turn on a stud 68, which extends upward from plate 61, and the rock-shaft 37 and vertical gear-wheel 38 are carried by a bracket 36, which is rigidly secured to the front axle, the rock-shaft being shown in this form as broken off and arm 53 and the steering-lever being omitted. 69 denotes brace-rods extending between the axles in order to give additional rigidity to the running-gear.

Having thus described my invention, I claim—

1. A vehicle running-gear frame having a power-driven axle in fixed relation to one end thereof and provided with wheels fixed to spindles connected to said axle by universal joints, an axle pivotally connected to the other end of said frame, wheels mounted to freely rotate on the last-mentioned axle, and steering connections between said pivoted axle and the power-driven spindles.

2. A vehicle of the character described having a power-driven rear axle, spindles connected to the ends of said axle by universal joints, wheels fixed to said spindles, a pivotally-connected front axle having wheels mounted to freely rotate on the ends thereof, and steering connections between said pivoted front axle and the spindles of the power-driven axle.

3. In a vehicle of the character described the combination with a rear driven axle and fixed sleeves in which it is inclosed, of spindle-carriers pivoted to the sleeves so as to swing in the horizontal plane, spindles lying within the carriers and connected to the axle by universal joints, a pivoted front axle, and steering connections between the said pivoted axle and the said spindle-carriers.

4. In a vehicle of the character described the combination with a rear driven axle and fixed sleeves in which it is inclosed, of spindle-carriers pivoted to the sleeves so as to swing in the horizontal plane, spindles lying within the carriers, universal joints by which the spindles are connected to the axle, wheels whose hubs are rigidly secured to the spindles, a pivoted front axle having wheels, and steering connections between said pivoted axle and the said spindle-carriers.

5. In a vehicle of the character described the combination with a rear driven axle and fixed sleeves in which it is inclosed, of spindle-carriers pivoted to the sleeves so as to swing in the horizontal plane, spindles lying within the carriers and having angular portions 30, universal joints by which the spindles are connected to the axle, wheels which rigidly engage the angular portions of the spindles, a pivoted front axle having wheels, and steering connections between said pivoted axle and the said spindle-carriers.

6. In a vehicle of the character described the combination with a rear driven axle and fixed sleeves in which it is inclosed, of spindle-carriers pivoted to the sleeves so as to swing in the horizontal plane, spindles lying within the carriers, universal joints by which the spindles are connected to the axle, wheels whose hubs are rigidly secured to the spindles, fixed roller-bearings lying between the hubs and the spindles, a pivoted front axle having wheels, and steering connections between said pivoted axle and the said spindle-carriers.

7. In a vehicle of the character described the combination with a rear driven axle and sleeves 22 in which it is inclosed, of spindle-carriers pivoted to said sleeves so as to swing in the horizontal plane and comprising sleeves 33 having slots with rollers journaled therein, universal joints by which the spindles are connected to the axle, wheels whose hubs are rigidly secured to the spindles, the rollers carried by the sleeves being engaged both by the spindles and the hubs, a pivoted front axle having wheels, and steering connections between said pivoted axle and the said spindle-carriers.

8. A vehicle of the character described having rear wheels fixed to spindles which are connected by universal joints to a power-driven rear axle, front wheels mounted to turn on their spindles and yielding steering connections intermediate the front wheels and the spindle-carriers, whereby both front and rear wheels are oscillated in the horizontal plane in the act of steering.

9. A vehicle of the character described having rear wheels fixed to spindles which are connected by universal joints to a power-driven rear axle, front wheels mounted to turn on their spindles, steering connections intermediate the front wheels and the spindle-carriers and yielding connections intermediate the front axle and the steering connections, whereby the force of blows caused by engagement of the front wheels with obstructions is taken up.

10. A vehicle of the character described having rear wheels fixed to spindles which are connected by universal joints to a power-driven rear axle, front wheels mounted to turn on their spindles, a reach connected to the rear axle and having at its forward end a bracket, a shaft journaled in said bracket and carrying a cross-piece 41, bolts passing loosely through the cross-piece and engaging the front axle, springs interposed between the cross-piece and the front axle, a cross-bar 48 pivoted to the reach and links intermediate the cross-bar and the cross-piece and intermediate the cross-bar and the spindle-carriers, whereby oscillation of the shaft will cause oscillation of both front and rear wheels in the horizontal plane.

11. In a vehicle of the character described the combination with a reach having a shaft journaled at its forward end and carrying a cross-piece, of a front axle, bolts passing loosely through the cross-piece and engaging the axle and springs interposed between the cross-piece and the axle.

12. In a vehicle of the character described the combination with a front axle, of a reach carrying a pivoted cross-piece and yielding connections intermediate the cross-piece and the axle.

13. In a vehicle of the character described the combination with a front axle having bosses, of a reach carrying a pivoted cross-piece having sockets, springs lying in the sockets and bearing on the bosses and bolts passing loosely through the cross-piece and engaging the bosses.

14. In a vehicle of the character described the combination with a front axle having wheels mounted to turn thereon, a reach carrying a pivoted cross-piece and yielding connections intermediate the cross-piece and said axle, of rear wheels fixed to spindles which are connected to a power-driven rear axle by universal joints, sleeves inclosing said axle, spindle-carriers pivoted to the sleeves and steering connections intermediate the pivoted cross-piece and the spindle-carriers.

15. In a vehicle of the character described the combination with a front axle having wheels mounted to turn thereon, a reach carrying at its forward end a bracket, a shaft journaled in said bracket and carrying a cross-piece, means for oscillating said shaft and yielding connections intermediate the cross-piece and said axle, of rear wheels fixed to spindles which are connected to a power-driven rear axle by universal joints, sleeves inclosing said axle, spindle-carriers pivoted to the sleeves and steering connections intermediate the cross-piece and the spindle-carriers.

16. In a vehicle of the character described the combination with a front axle, a reach having at its forward end a bracket and a shaft journaled in said bracket and carrying a cross-piece, of yielding connections intermediate the cross-piece and the axle and means for oscillating the shaft.

17. In a vehicle of the character described the combination with a front axle, a reach having at its forward end a bracket and a shaft journaled in the base of said bracket and carrying a cross-piece and a bevel gear-wheel, of yielding connections intermediate the cross-piece and the axle, a rock-shaft journaled in the bracket and carrying an intermeshing gear-wheel and a steering-lever detachably connected to the rock-shaft.

18. In a vehicle of the character described the rock-shaft 37 having socket 52 in combination with the U-shaped steering-lever adapted to engage the socket and having a spring-controlled hooked latch by which it is detachably secured to the socket.

19. The U-shaped steering-lever having pivoted therein the hooked latch 54, substantially as shown, for the purpose specified.

In testimony whereof I affix my signature in presence of two witnesses.

LOUIS J. DIRAND.

Witnesses:
E. F. FELIERI,
WALTER HOLCOMB.